US012633616B2

(12) United States Patent
Sakamoto et al.

(10) Patent No.: US 12,633,616 B2
(45) Date of Patent: May 19, 2026

(54) BATTERY PACK

(71) Applicant: HONDA MOTOR CO., LTD., Tokyo (JP)

(72) Inventors: Hideki Sakamoto, Saitama (JP); Harumi Takedomi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 602 days.

(21) Appl. No.: 18/114,594

(22) Filed: Feb. 27, 2023

(65) Prior Publication Data

US 2023/0307796 A1 Sep. 28, 2023

(30) Foreign Application Priority Data

Mar. 25, 2022 (JP) ................................. 2022-050765

(51) Int. Cl.
| | |
|---|---|
| *H01M 50/298* | (2021.01) |
| *H01M 50/211* | (2021.01) |
| *H01M 50/296* | (2021.01) |
| *H01M 50/503* | (2021.01) |

(52) U.S. Cl.
CPC ....... *H01M 50/298* (2021.01); *H01M 50/211* (2021.01); *H01M 50/296* (2021.01); *H01M 50/503* (2021.01)

(58) Field of Classification Search
None
See application file for complete search history.

(56) References Cited

U.S. PATENT DOCUMENTS

| | | | | |
|---|---|---|---|---|
| 2020/0127258 A1* | 4/2020 | Lim | .................... | H01M 50/204 |
| 2020/0388814 A1* | 12/2020 | Jang | .................... | H01M 50/502 |

FOREIGN PATENT DOCUMENTS

| | | |
|---|---|---|
| JP | 2007-059088 A | 3/2007 |
| JP | 2012-138268 A | 7/2012 |
| JP | 2020-177857 A | 10/2020 |

* cited by examiner

*Primary Examiner* — Jonathan Crepeau
(74) *Attorney, Agent, or Firm* — Paratus Law Group, PLLC

(57) ABSTRACT

A battery pack includes a plurality of laminated cells, a battery case, and a wiring coupling portion. A first laminated cell positioned at an end portion of the electrical flow path and the wiring coupling portion are electrically coupled via a conductive coupling member. The first laminated cell includes a cell body portion and a cell terminal extending from the cell body portion in a second direction orthogonal to the first direction of the horizontal direction. The conductive coupling member is formed of a single plate-shaped member. The conductive coupling member does not protrude in an extending direction of the cell terminal with respect to an abutting portion abutting against the cell terminal, at least in a region on a lower side of upper end portions of the plurality of laminated cells when viewed from the first direction.

8 Claims, 8 Drawing Sheets

BATTERY PACK

CROSS-REFERENCE TO RELATED APPLICATIONS

This application is based on and claims priority under 35 USC 119 from Japanese Patent Application No. 2022-050765 filed on Mar. 25, 2022.

TECHNICAL FIELD

The present disclosure relates to a battery pack mounted on an electric vehicle or the like.

BACKGROUND ART

In recent years, researches and development on secondary batteries which contribute to efficiency of energy have been carried out to ensure access to convenient, reliable, sustainable, and advanced energy for more people (for example, JP-A-2007-59088, JP-A-2012-138268, and JP-A-2020-177857).

Laminated cells are known as the secondary batteries. JP-A-2007-59088 and JP-A-2012-138268 disclose battery packs in which a plurality of laminated cells are stacked in a vertical direction and accommodated in a case.

However, when the laminated cells are stacked in the vertical direction, gravity of a cell stacked on an upper side acts on a cell on a lower side, and thus a load acting on the cell varies depending on a position of the cell. Although this problem is solved by stacking the laminated cells in a horizontal direction, space saving is required as a further problem.

For example, as a portion where space saving is required, coupling between a battery and a wiring coupling portion (junction board) is included. In JP-A-2020-177857, an electrode of a square cell is coupled to a terminal block provided in a battery module, and is electrically coupled to a junction board via the terminal block and a bus bar. The terminal block protrudes to an outside of the battery module, and a space corresponding thereto is required. When this configuration is applied to a laminated cell stacked in the horizontal direction, a similar problem may occur.

SUMMARY

The present disclosure provides a battery pack capable of coupling laminated cells stacked in a horizontal direction to a wiring coupling portion in a space-saving manner. Further, the present disclosure contributes to efficiency of energy.

According to an aspect of the present disclosure, there is provided a battery pack including: a plurality of laminated cells stacked in a first direction of a horizontal direction; a battery case accommodating the plurality of laminated cells; and a wiring coupling portion disposed on an upper side of the plurality of laminated cells, in which: the plurality of laminated cells are electrically coupled to each other to form an electrical flow path; a first laminated cell positioned at an end portion of the electrical flow path and the wiring coupling portion are electrically coupled via a conductive coupling member; the first laminated cell includes a cell body portion and a cell terminal extending from the cell body portion in a second direction orthogonal to the first direction of the horizontal direction; the conductive coupling member is formed of a single plate-shaped member; and the conductive coupling member does not protrude in an extending direction of the cell terminal with respect to an abutting portion abutting against the cell terminal, at least in a region on a lower side of upper end portions of the plurality of laminated cells when viewed from the first direction.

According to the present disclosure, coupling between the laminated cells and the wiring coupling portion can be performed in a space-saving manner while stacking the laminated cells in the horizontal direction.

DESCRIPTION OF EMBODIMENTS

Figure 1:
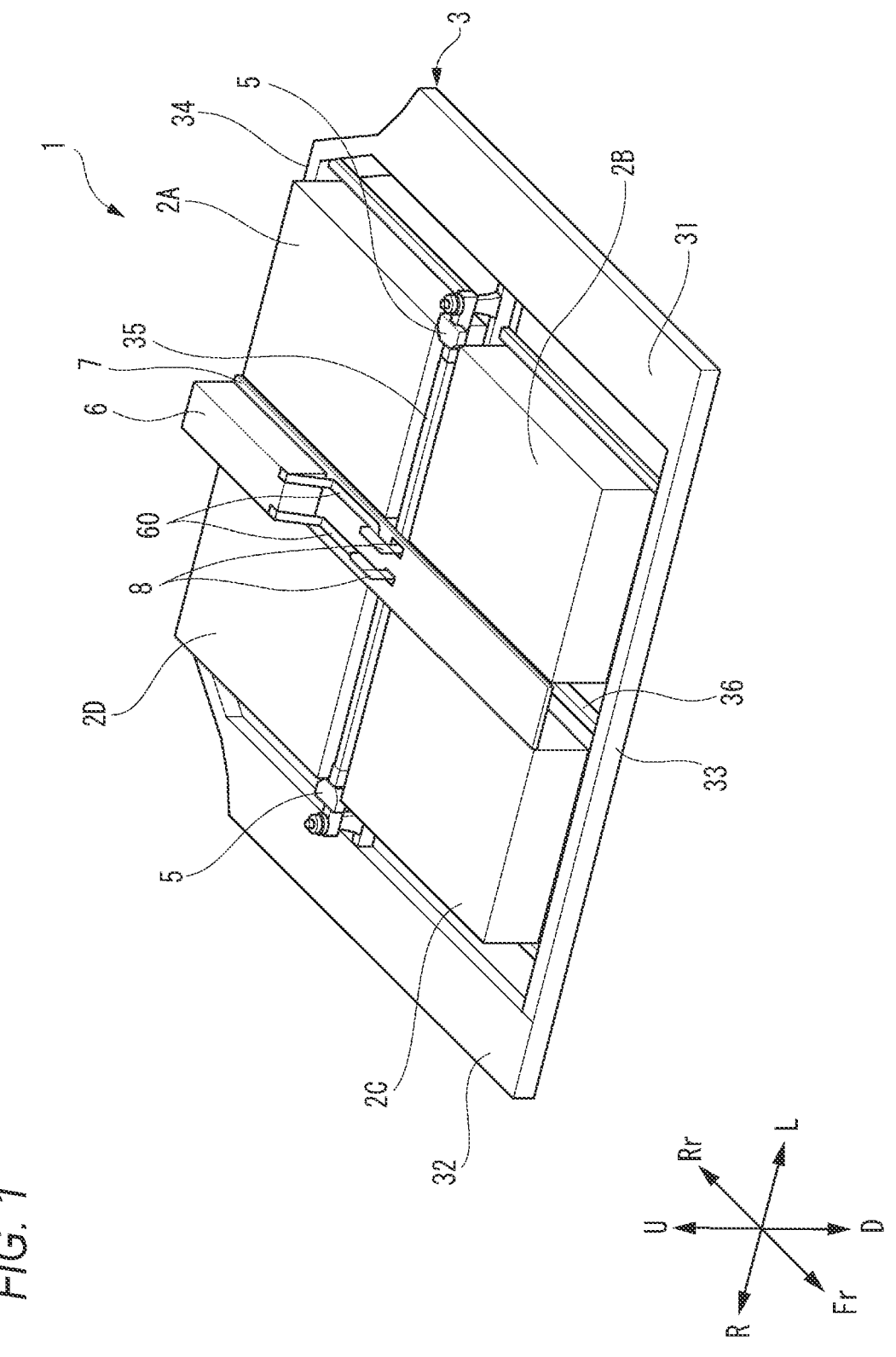
FIG. 1 is a schematic perspective view illustrating an internal structure of a battery pack 1.

Hereinafter, an embodiment of the present disclosure will be described with reference to FIGS. 1 to 8. The drawings are to be viewed in directions of the reference signs, and in the following descriptions, for simplicity of description, front and rear, left and right, and upper and lower are set, and in the drawings, a front side is represented by Fr, a rear side is represented by Rr, a left side is represented by L, a right side is represented by R, an upper side is represented by U. and a lower side is represented by D for convenience.
(Battery Pack)

As illustrated in FIGS. 1 to 4, a battery pack 1 according to the embodiment of the present disclosure includes a plurality of laminated cells 21 stacked in a horizontal direction (in the embodiment, a left-right direction), and a battery case 3 accommodating the plurality of laminated cells 21, and is disposed under a floor (on a lower side of a floor panel) of a vehicle (not illustrated), for example.

Figure 3:
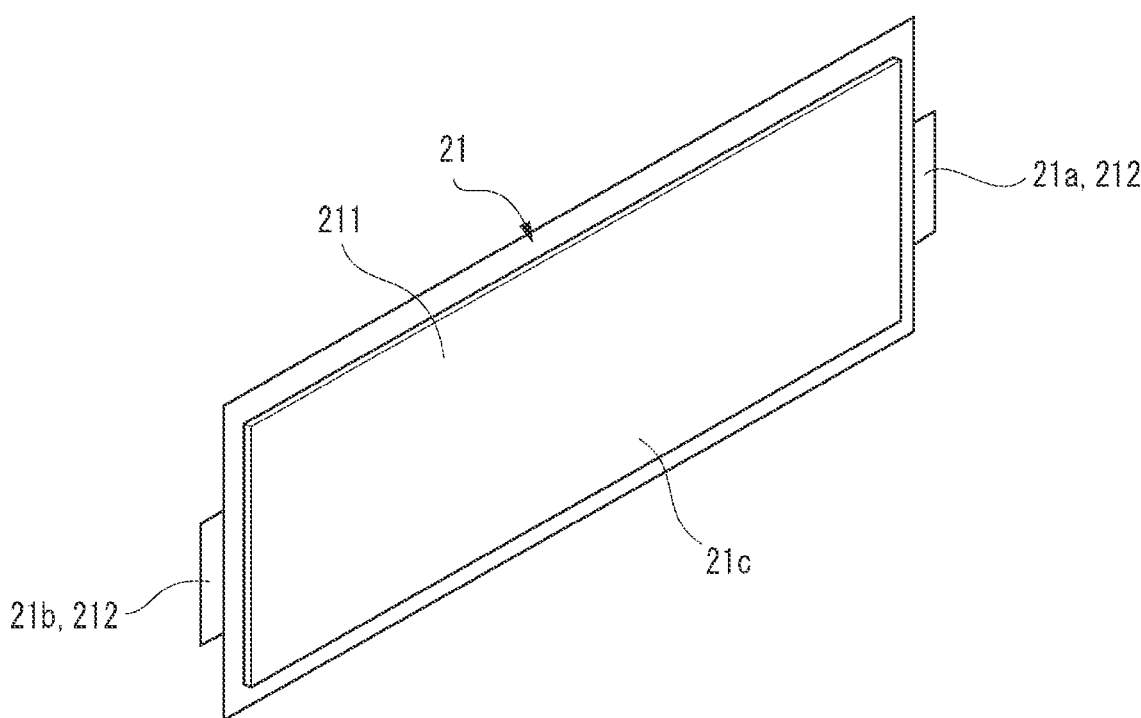
FIG. 3 is a perspective view of a laminated cell 21.
Figure 4:
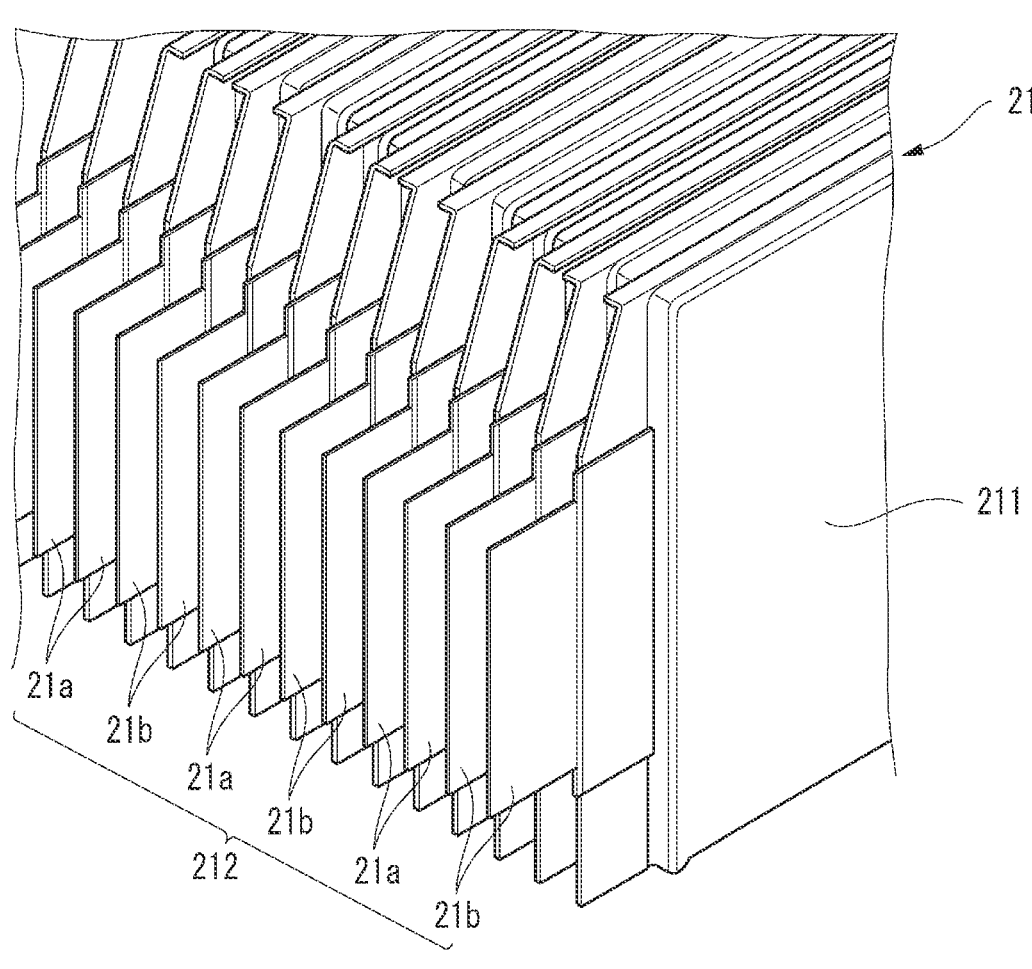
FIG. 4 is a partial perspective view of stacked laminated cells 21.

Each of the laminated cells 21 is, for example, a solid-state battery. As illustrated in FIG. 3, the laminated cell 21 formed of the solid-state battery includes a positive electrode to which a positive electrode tab 21a is coupled, a negative electrode to which a negative electrode tab 21b is coupled, a solid electrolyte disposed between the positive electrode and the negative electrode, and a laminate film 21c which accommodates these, and performs charging and discharging by giving and receiving lithium ions between the positive electrode and the negative electrode via the solid electrolyte. Hereinafter, a portion of the laminated cell 21 provided between the positive electrode tab 21a and the negative electrode tab 21b is also referred to as a cell body portion 211. When the positive electrode tab 21a and the negative electrode tab 21b are not distinguished from each other, the positive electrode tab 21a and the negative electrode tab 21b are also collectively referred to as a cell terminal 212.

The solid electrolyte is not particularly limited as long as the solid electrolyte has lithium ion conductivity and insulating properties, and a material generally used for an all-solid-state lithium-ion battery may be used. Examples thereof include inorganic solid electrolytes such as sulfide solid electrolyte materials, oxide solid electrolyte materials, and lithium-containing salts, polymer-based solid electrolytes such as polyethylene oxide, and gel-based solid electrolytes containing lithium-containing salts or lithium ion conductive ionic liquids. A form of a solid electrolyte material is not particularly limited, and examples thereof include a particulate form.

Figure 2:
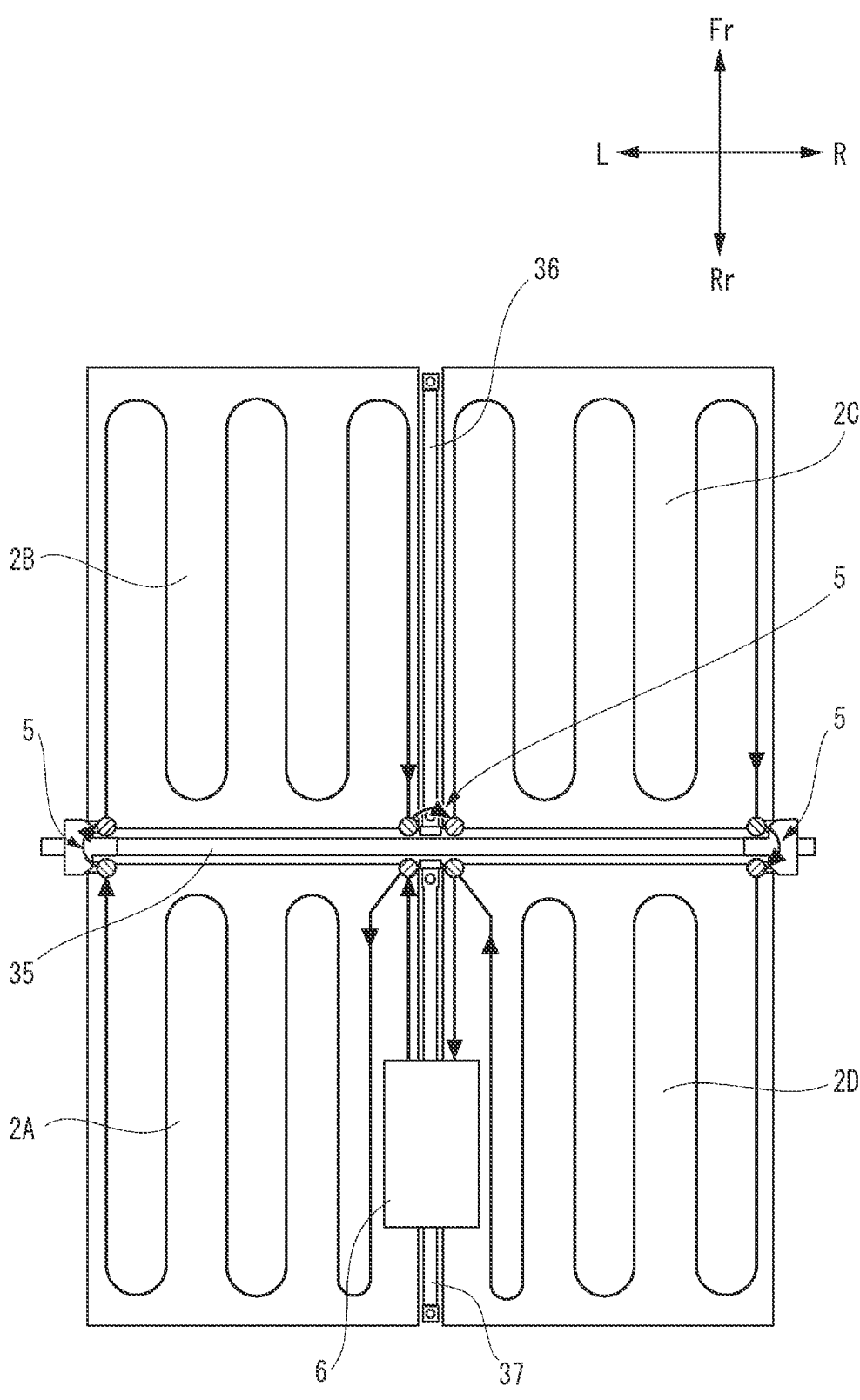
FIG. 2 is a schematic plan view schematically illustrating a flow of electricity in the battery pack 1.

As illustrated in FIGS. 1 and 2, the plurality of laminated cells 21 are divided into a plurality of cell groups 2A to 2D. For example, the battery case 3 is divided into a first cell group 2A disposed at a left rear portion of the battery case 3, a second cell group 2B disposed at a left front portion of the battery case 3, a third cell group 2C disposed at a right front portion of the battery case 3, and a fourth cell group 2D disposed at a right rear portion of the battery case 3. The plurality of cell groups 2A to 2D are arranged at predetermined intervals in the horizontal direction.

Figure 5:
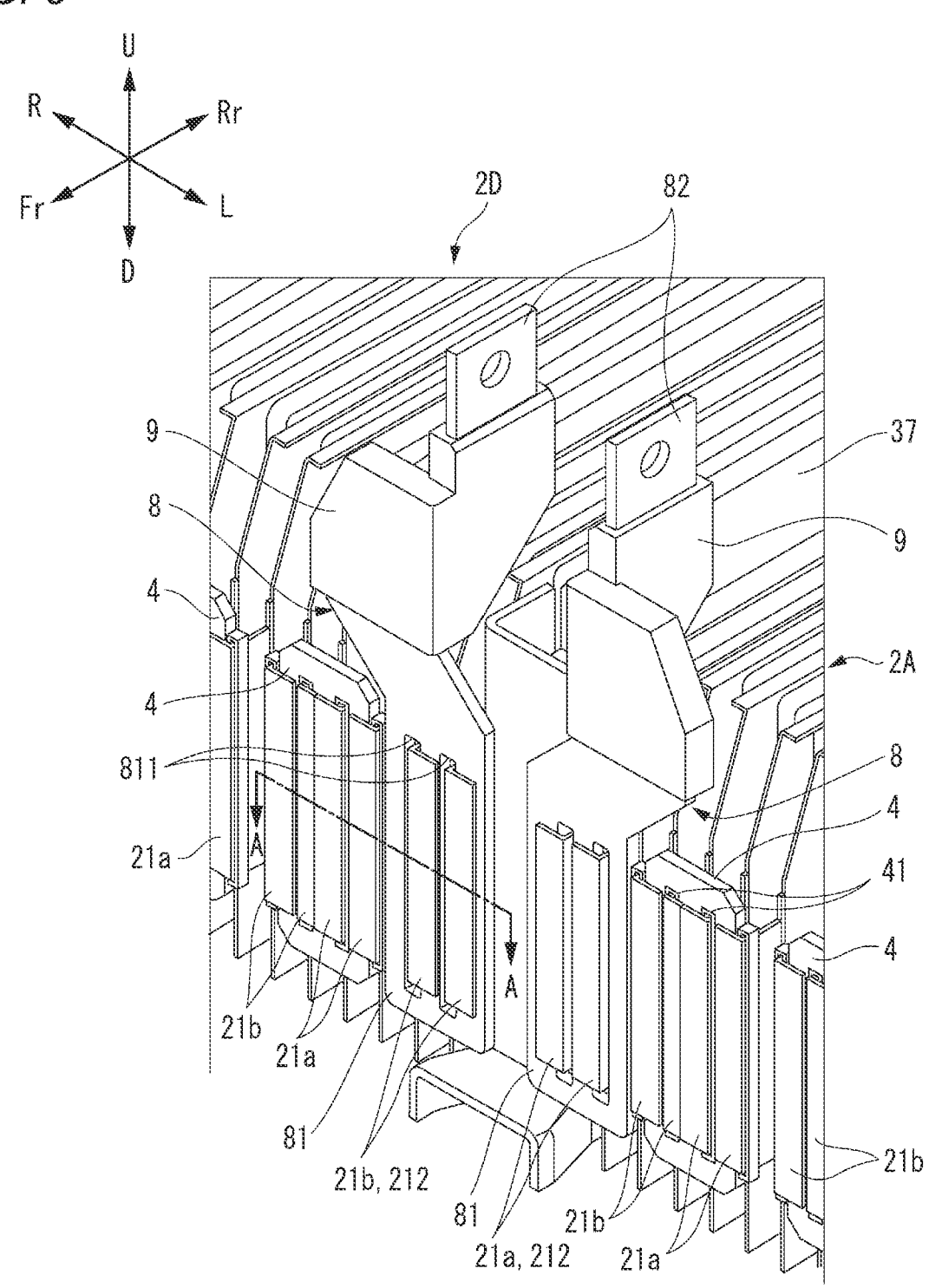
FIG. 5 is a perspective view illustrating inter-cell coupling members 4 and conductive coupling members 8 coupled to the plurality of laminated cells 21.

In the plurality of laminated cells 21 constituting the cell groups 2A to 2D, two adjacent laminated cells 21, 21 are coupled in parallel, and the laminated cells 21, 21 coupled in parallel are electrically coupled in series to adjacent laminated cells 21, 21 coupled in parallel. In the embodiment, as illustrated in FIG. 5, adjacent laminated cells 21, 21 are coupled in parallel via an inter-cell coupling member 4, and further adjacent laminated cells 21, 21 are coupled in parallel via the inter-cell coupling member 4, so that the laminated cells 21, 21 coupled in parallel and the laminated cells 21, 21 adjacent thereto are coupled in series.

Figure 6:
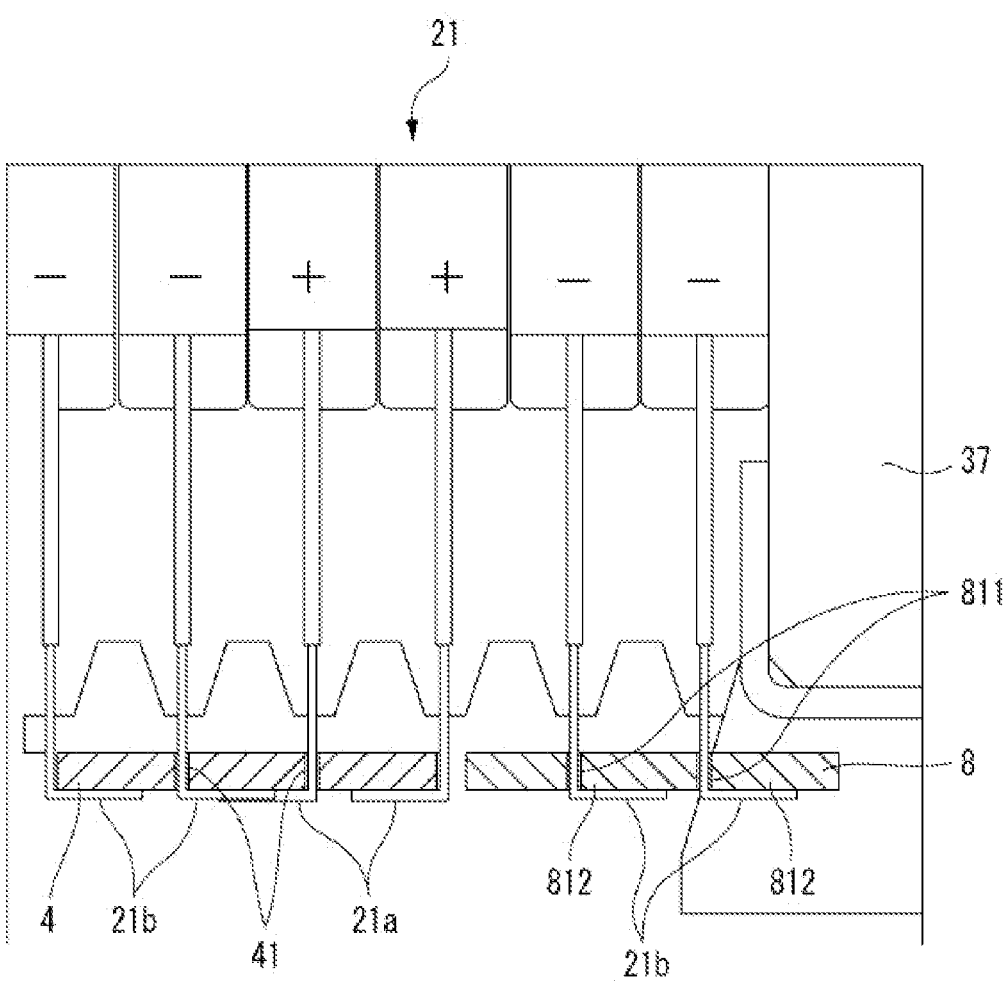
FIG. 6 is a cross-sectional view taken along a line A-A in FIG. 5.

More specifically, the inter-cell coupling member 4 has two openings 41. As illustrated in FIG. 6, the negative electrode tab 21b inserted through one opening 41 and the negative electrode tab 21b extending from one side of the inter-cell coupling member 4 are bent at 90° from the one side to be prevented from coming off, the positive electrode tab 21a inserted through the other opening 41 and the positive electrode tab 21a extending from the other side of the inter-cell coupling member 4 are bent at 90° from the other side to be prevented from coming off, and the tabs 21b. 21b, 21a, and 21a are joined to the inter-cell coupling member 4 in a state where the negative electrode tab 21b inserted through the one opening 41 and the positive electrode tab 21a inserted through the other opening 41 are overlapped with each other. In the plurality of laminated cells 21 constituting the cell groups 2A to 2D, all cells may be coupled in series, and a coupling method is not limited.

Returning to FIG. 2, the cell groups 2A to 2D are electrically coupled in series via a cell group coupling member 5. For example, an electrical flow path start of the first cell group 2A is coupled to a wiring coupling portion 6, and an electrical flow path end of the first cell group 2A is coupled to an electrical flow path start of the second cell group 2B via the cell group coupling member 5. An electrical flow path end of the second cell group 2B is coupled to an electrical flow path start of the third cell group 2C via the cell group coupling member 5, and an electrical flow path end of the third cell group 2C is coupled to an electrical flow path start of the fourth cell group 2D via the cell group coupling member 5. An electrical flow path end of the fourth cell group 2D is coupled to the wiring coupling portion 6.

As illustrated in FIG. 1, the battery case 3 has a lattice-shaped frame structure in a plan view. As illustrated in FIGS. 1 and 2, the frame structure includes a pair of side frames 31 and 32 facing each other in the left-right direction so as to sandwich the cell groups 2A to 2D, a front frame 33 and a rear frame 34 facing each other in a front-rear direction so as to sandwich the cell groups 2A to 2D, an intermediate horizontal frame 35 disposed between the first cell group 2A and the second cell group 2B and between the third cell group 2C and the fourth cell group 2D, a first intermediate vertical frame 36 disposed between the second cell group 2B and the third cell group 2C, and a second intermediate vertical frame 37 disposed between the first cell group 2A and the fourth cell group 2D. According to such a battery case 3, not only deformation of the battery case 3 at the time of collision can be prevented, but also the cell groups 2A to 2D can be protected from impact at the time of collision.

The wiring coupling portion 6 is a junction board on which various wiring components are mounted and which electrically couples the cell groups 2A to 2D to an external device (not illustrated). The wiring coupling portion 6 is disposed on an upper side of the plurality of laminated cells 21. More specifically, the wiring coupling portion 6 is mounted on a mounting plate 7 provided on upper sides of the first intermediate vertical frame 36 and the second intermediate vertical frame 37. The wiring coupling portion 6 may have various wiring components accommodated in a box, or the various wiring components may be exposed without being accommodated in a box.

(Conductive Coupling Member)

Next, conductive coupling members 8 which electrically couple the wiring coupling portion 6 to the electrical flow path start of the first cell group 2A and to the electrical flow path end of the fourth cell group 2D will be described with reference to FIGS. 5 to 8.

As illustrated in FIG. 5, a conductive coupling member 8 coupled to the electrical flow path start of the first cell group 2A is coupled to the positive electrode tabs 21a, 21a of the laminated cells 21, 21 positioned at the electrical flow path start of the first cell group 2A and coupled in parallel. A conductive coupling member 8 coupled to the electrical flow path end of the fourth cell group 2D is coupled to the negative electrode tabs 21b, 21b of the laminated cells 21, 21 positioned at the electrical flow path end of the fourth cell group 2D and coupled in parallel. The two conductive coupling members 8 have a mirror symmetrical shape with respect to a vertical plane extending in the front-rear direction. In the following description, the two conductive coupling members 8 are not particularly distinguished from each other.

Figure 7:
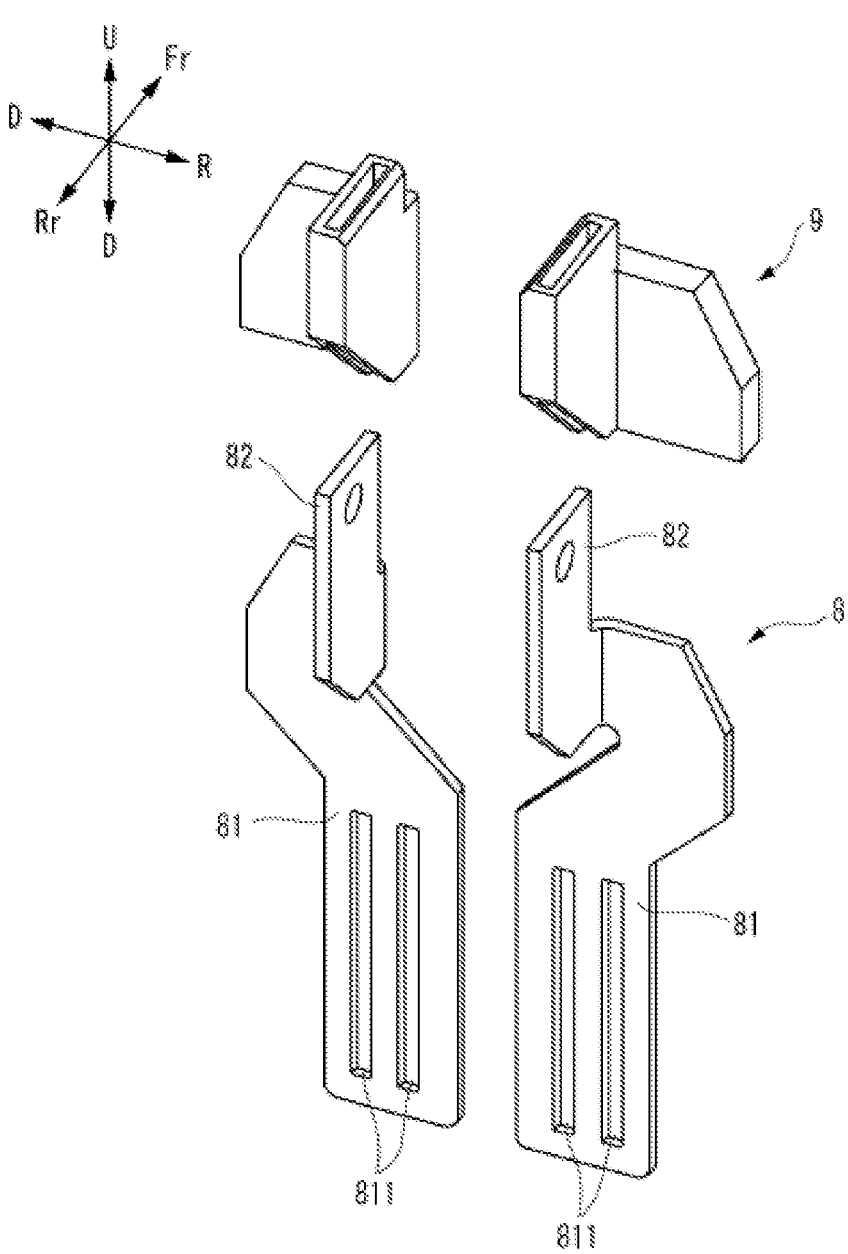
FIG. 7 is a perspective view illustrating the conductive coupling members 8 and insulating covers 9 in a state before being mounted on the conductive coupling members 8.

As illustrated in FIGS. 5 and 7, each of the conductive coupling members 8 is formed of a single plate-shaped member. The conductive coupling member 8 includes a body portion 81 which abuts against the cell terminal 212, and a coupling portion 82 which is coupled to a plate-shaped conductive coupling member 60 extending from the wiring coupling portion 6. The body portion 81 linearly extends upward, and the coupling portion 82 is provided at an upper portion of the body portion 81. Thus, a single plate-shaped member couples the cell terminal 212 of the laminated cell 21 and the conductive coupling member 60 extending from the wiring coupling portion 6, so that it is not necessary to provide a relay coupling member on the way, and the number of components can be reduced.

The body portion 81 has two openings 811 through which cell terminals 212 can be inserted. The cell terminal 212 coupled to the conductive coupling member 8 extends from the cell body portion 211 toward an intermediate horizontal frame 35 side (front side in the embodiment) and is inserted into the opening 811. As illustrated in FIG. 6, the cell terminal 212 inserted into the opening 811 is bent by 90° to be prevented from coming off, and then is electrically coupled through a joining process. With such a simple configuration, the conductive coupling member 8 and the cell terminal 212 can be coupled. Here, a portion of the body portion 81 abutting against the cell terminal 212 is referred to as an abutting portion 812. In the embodiment, the abutting portion 812 is disposed in the vicinity of the openings 811.

Since the body portion 81 linearly extends upward, the body portion 81 does not protrude in an extending direction (forward direction in the embodiment) of the cell terminal 212 with respect to the abutting portion 812 in a region on a lower side of upper end portions of the plurality of laminated cells 21 when viewed from a direction in which the plurality of laminated cells 21 are stacked (hereinafter also referred to as a cell stacking direction).

With such a configuration, a distance between the first cell group 2A and the intermediate horizontal frame 35 and a distance between the fourth cell group 2D and the intermediate horizontal frame 35 can be reduced. That is, a distance between the first cell group 2A and the second cell group 2B adjacent to the first cell group 2A and a distance between the fourth cell group 2D and the third cell group 2C adjacent to the fourth cell group 2D can be reduced. Therefore, space saving in the extending direction of the cell terminal 212 can be achieved.

The body portion 81 "does not protrude" in the extending direction of the cell terminal 212 with respect to the abutting portion 812 means, for example, that body portions 81 do not bend in the same direction, that the body portion 81 does not have portions protruding in the same direction, or that the body portions 81 do not curve in the same direction.

The coupling portion 82 is a portion of the conductive coupling member 8 which is coupled to the conductive coupling member 60 extending from the wiring coupling portion 6 above the upper end portions of the laminated cells 21. The coupling portion 82 is formed by bending an upper portion of the plate-shaped member toward a wiring coupling portion 6 side (rear side in the embodiment) with respect to the body portion 81. By bringing the coupling portion 82 close to the wiring coupling portion 6, coupling between the conductive coupling member 8 and the conductive coupling member 60 extending from the wiring coupling portion 6 can be simplified. The coupling portion 82 may be formed without bending the plate-shaped member, and may be, for example, a portion of the plate-shaped member which is not bent above the upper end portions of the laminated cells 21.

Figure 8:
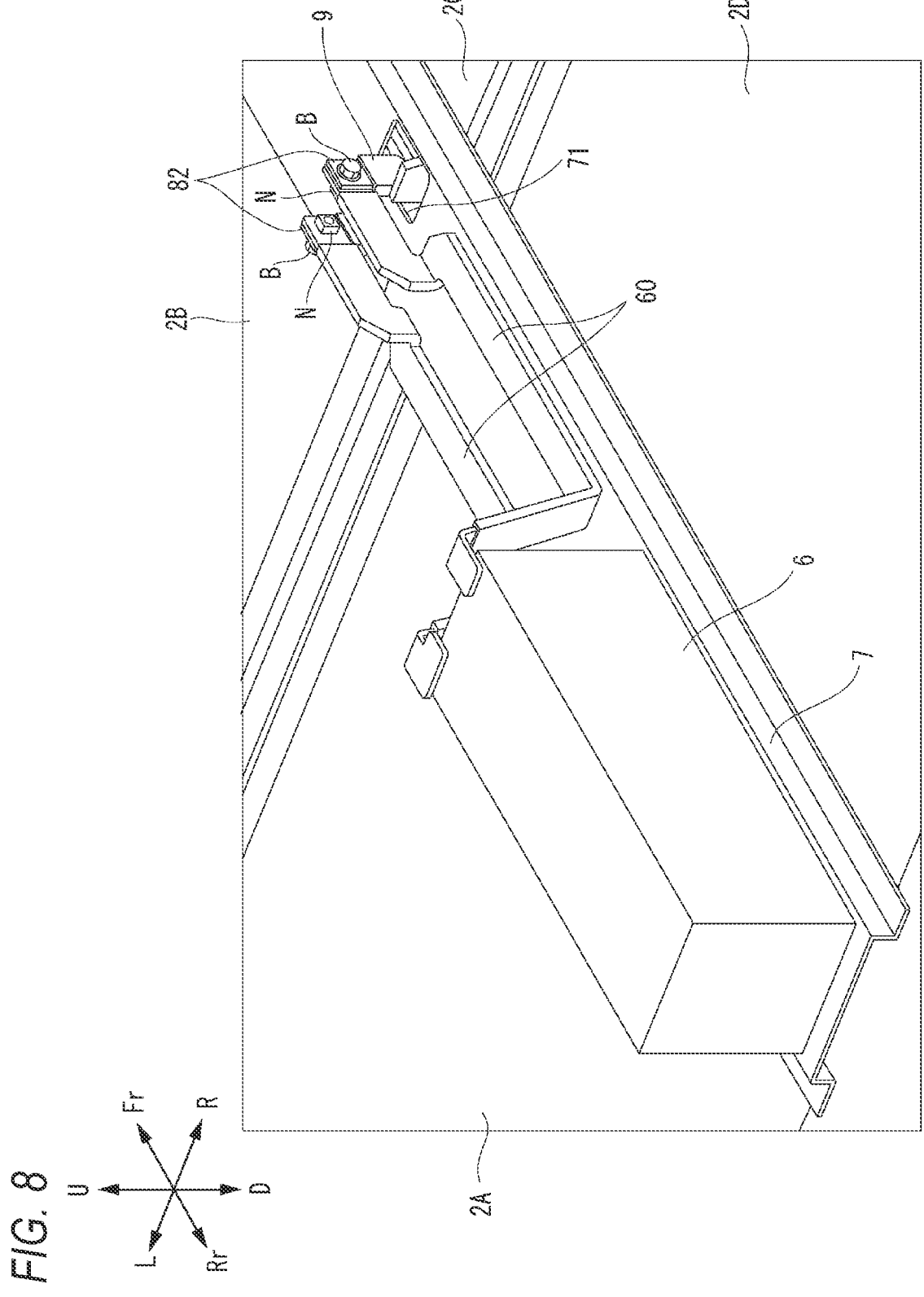
FIG. 8 is a perspective view illustrating a state in which a wiring coupling portion 6 and the conductive coupling members 8 are electrically coupled via conductive coupling members 60.

As illustrated in FIG. 8, a part of the conductive coupling members 8 is inserted through holes 71 provided in the mounting plate 7, and coupling portions 82 are coupled to conductive coupling members 60 extending from the wiring coupling portion 6 on an upper side of the mounting plate 7. Specifically, the coupling portions 82 and the conductive coupling members 60 are fastened by bolts B and nuts N inserted through bolt holes formed in the coupling portions 82 and the conductive coupling members 60, respectively. With such a configuration, it is possible to easily perform positioning when coupling the coupling portions 82 and the conductive coupling members 60. In an example illustrated in FIG. 8, the bolts B are inserted into the bolt holes in the horizontal direction, but the bolts B may be inserted into the bolt holes in the vertical direction.

Insulating covers 9 are preferably provided between the conductive coupling members 8 and the holes 71 in the mounting plate 7. As illustrated in FIGS. 5 and 7, each of the insulating covers 9 is mounted on the conductive coupling member 8 from an upper side. The insulating cover 9 covers a portion of the conductive coupling member 8 which overlaps with a hole 71 (in the embodiment, an upper portion of the body portion 81, a lower portion of the coupling portion 82, and a coupling portion (bent portion) thereof) when viewed in the cell stacking direction. By providing the insulating cover 9 between the conductive coupling member 8 and the hole 71, when the mounting plate 7 is formed of metal or the like, it is possible to ensure insulation between the conductive coupling member 8 and the mounting plate 7.

The insulating cover 9 is preferably in contact with the hole 71. In the embodiment, a portion of the insulating cover 9 which covers the coupling portion 82 is in contact with the hole 71. Accordingly, when the coupling portion 82 of the conductive coupling member 8 and the conductive coupling member 60 are fastened by the bolts, the insulating cover 9 is in contact with the hole 71, and thus rotation of the conductive coupling member 8 can be stopped. A portion of the insulating cover 9 which covers the body portion 81 may be in contact with the hole 71.

Although one embodiment has been described above with reference to the drawings, it is needless to say that the present invention is not limited to such an example. It is apparent to those skilled in the art that various changes and modifications can be conceived within the scope of the claims, and it is also understood that such changes and modifications naturally belong to the technical scope of the present invention. Constituent elements in the above embodiment may be freely combined without departing from the gist of the invention.

For example, in the above embodiment, the body portion 81 of the conductive coupling member 8 linearly extends upward in the region on the lower side of the upper end portions of the plurality of laminated cells 21, but the present disclosure is not limited thereto. For example, in the same region, the body portion 81 may be curved or bent in an opposite direction from the extending direction of the cell terminal 212 from the cell body portion 211. With such a configuration as well, space saving in the extending direction of the cell terminal 212 can be achieved.

In the above embodiment, the wiring coupling portion 6 is provided at an opposite side from the extending direction of the cell terminal 212 coupled to the conductive coupling member 8, and thus the coupling portion 82 of the conductive coupling member 8 is formed by bending the upper portion of the plate-shaped member to the opposite side from the extending direction of the cell terminal 212, but the present invention is not limited thereto. When the wiring coupling portion 6 is provided on an extending direction side of the cell terminal 212 coupled to the conductive coupling member 8, the coupling portion 82 may be formed by bending the upper portion of the plate-shaped member in the extending direction of the cell terminal 212 with respect to the body portion 81. Also with such a coupling portion 82, since the coupling portion 82 is provided on the upper side of the upper end portions of the laminated cells 21, the space saving in the extending direction of the cell terminal 212 is not affected.

In the present description, at least the following matters are described. Although corresponding components in the above embodiment are shown in parentheses, the present invention is not limited thereto.

(1) A battery pack (battery pack 1) including:
a plurality of laminated cells (laminated cells 21) stacked in a first direction (cell stacking direction, left-right direction) of a horizontal direction;
a battery case (battery case 3) accommodating the plurality of laminated cells; and
a wiring coupling portion (wiring coupling portion 6) disposed on an upper side of the plurality of laminated cells, in which:
the plurality of laminated cells are electrically coupled to each other to form an electrical flow path;
a first laminated cell (laminated cell 21) positioned at an end portion of the electrical flow path and the wiring coupling portion are electrically coupled via a conductive coupling member (conductive coupling member 8).
the first laminated cell includes a cell body portion (cell body portion 211) and a cell terminal (cell terminal 212) extending from the cell body portion in a second direction (front-rear direction) orthogonal to the first direction in the horizontal direction;
the conductive coupling member is formed of a single plate-shaped member; and
the conductive coupling member does not protrude in an extending direction of the cell terminal (extending direction of the cell terminal 212, forward direction) with respect to an abutting portion (abutting portion 812) abutting against the cell terminal, at least in a region on a lower side of upper end portions of the plurality of laminated cells when viewed from the first direction.

According to (1), the conductive coupling member is formed of a single plate-shaped member, and does not protrude in the extending direction of the cell terminal with respect to the abutting portion abutting against the cell terminal, at least in the region on the lower side of the upper end portions of the plurality of laminated cells when viewed from the first direction. With this configuration, space saving in the extending direction of the cell terminal can be achieved.

(2) The battery pack according to (1), in which
in the conductive coupling member, a body portion (body portion 81) including the abutting portion linearly extends upward when viewed from the first direction.

According to (2), the body portion linearly extends upward when viewed from the first direction, so that space saving can be achieved with a simple configuration.

(3) The battery pack according to (2), in which
the conductive coupling member includes:
the body portion; and
a coupling portion (coupling portion 82) provided at an upper portion of the body portion and coupled to another conductive coupling member (conductive coupling member 60) extending from the wiring coupling portion above the region.

According to (3), the conductive coupling member includes the coupling portion coupled to the other conductive coupling member extending from the wiring coupling portion. Therefore, since the conductive coupling member formed of a single plate-shaped member couples the cell terminal of the laminated cell and the conductive coupling member extending from the wiring coupling portion, it is not necessary to provide a relay coupling member on the way, and the number of components can be reduced.

(4) The battery pack according to (3), in which
the coupling portion is formed by bending a part of the plate-shaped member with respect to the body portion.

8

According to (4), since the coupling portion is formed by bending a part of the plate-shaped member, the coupling portion can be brought close to the wiring coupling portion. Therefore, coupling between the conductive coupling member and the conductive coupling member extending from the wiring coupling portion is simplified.

(5) The battery pack according to (3) or (4), further including:
a mounting plate (mounting plate 7) which is disposed on the upper side of the plurality of laminated cells and on which the wiring coupling portion is mounted, in which:
the mounting plate has a hole (hole 71) through which a part of the conductive coupling member is inserted; and
the coupling portion is coupled to the other conductive coupling member on an upper side of the mounting plate.

According to (5), since a part of the conductive coupling member is inserted into the hole in the mounting plate and the coupling portion is coupled to the other conductive coupling member on the upper side of the mounting plate, it is possible to easily perform positioning when coupling the coupling portion and the conductive coupling member.

(6) The battery pack according to (5), further including:
an insulating member (insulating cover 9) attached to the conductive coupling member and disposed between the conductive coupling member and the hole.

According to (6), since the insulating member is disposed between the conductive coupling member and the hole, it is possible to ensure insulation between the conductive coupling member and the mounting plate.

(7) The battery pack according to (6), in which
the insulating member is in contact with at least a part of the hole.

According to (7), since the insulating member is in contact with at least a part of the hole, rotation of the conductive coupling member can be stopped when the coupling portion of the conductive coupling member and the conductive coupling member are fastened by bolts.

(8) The battery pack according to any one of (2) to (7), in which:
the body portion has an opening (opening 811) through which the cell terminal is inserted; and
the abutting portion is positioned in the vicinity of the opening.

According to (8), the cell terminal can be inserted into the opening of the conductive coupling member and coupled to the conductive coupling member. Therefore, the cell terminal and the conductive coupling member can be coupled with a simple configuration.

(9) The battery pack according to any one of (1) to (8), in which:
the plurality of laminated cells are divided into a first cell group (first cell group 2A, fourth cell group 2D) including the first laminated cell and a second cell group (second cell group 2B, third cell group 2C); and
the second cell group is disposed adjacent to the first cell group in the extending direction of the cell terminal of the first laminated cell.

According to (9), the second cell group is disposed adjacent to the first cell group in the extending direction of the cell terminal. Since space saving is achieved by preventing a single plate-shaped member from protruding in the extending direction of the cell terminal, the second cell group can be disposed adjacent to the first cell group in the extending direction of the cell terminal.

(10) The battery pack according to any one of (1) to (9), in which the first laminated cell and a second laminated cell (laminated cell 21) adjacent to the first laminated cell are coupled to the conductive coupling member.

According to (10), the plurality of laminated cells can be coupled to the conductive coupling member which is a single plate-shaped member.

(11) The battery pack according to any one of (1) to (10), in which the laminated cell is a solid-state battery.

According to (11), since an energy density is high, a larger number of laminated cells can be arranged.

What is claimed is:

1. A battery pack comprising:

a plurality of laminated cells stacked in a first direction of a horizontal direction;

a battery case accommodating the plurality of laminated cells; and a wiring coupling portion disposed on an upper side of the plurality of laminated cells, wherein:

the plurality of laminated cells are electrically coupled to each other to form an electrical flow path;

a first laminated cell positioned at an end portion of the electrical flow path and the wiring coupling portion are electrically coupled via a conductive coupling member;

the first laminated cell includes a cell body portion and a cell terminal extending from the cell body portion in a second direction orthogonal to the first direction of the horizontal direction;

the conductive coupling member is formed of a single plate-shaped member;

the conductive coupling member does not protrude in an extending direction of the cell terminal with respect to an abutting portion abutting against the cell terminal, at least in a region on a lower side of upper end portions of the plurality of laminated cells when viewed from the first direction, in the conductive coupling member, a body portion including the abutting portion linearly extends upward when viewed from the first direction, the conductive coupling member includes:

the body portion; and a coupling portion provided at an upper portion of the body portion and coupled to another conductive coupling member extending from the wiring coupling portion above the region, the battery pack further comprises a mounting plate which is disposed on the upper side of the plurality of laminated cells and on which the wiring coupling portion is mounted, the mounting plate has a hole through which a part of the conductive coupling member is inserted, and the coupling portion is coupled to the other conductive coupling member on an upper side of the mounting plate.

2. The battery pack according to claim 1, wherein the coupling portion is formed by bending a part of the plate-shaped member with respect to the body portion.

3. The battery pack according to claim 1, further comprising:

an insulating member attached to the conductive coupling member and disposed between the conductive coupling member and the hole.

4. The battery pack according to claim 3, wherein the insulating member is in contact with at least a part of the hole.

5. The battery pack according to claim 1, wherein:

the body portion has an opening through which the cell terminal is inserted; and the abutting portion is positioned in the vicinity of the opening.

6. The battery pack according to claim 1, wherein:

the plurality of laminated cells are divided into a first cell group including the first laminated cell and a second cell group; and the second cell group is disposed adjacent to the first cell group in the extending direction of the cell terminal of the first laminated cell.

7. The battery pack according to claim 1, wherein the first laminated cell and a second laminated cell adjacent to the first laminated cell are coupled to the conductive coupling member.

8. The battery pack according to claim 1, wherein the laminated cell is a solid-state battery.

* * * * *